Figure 1:
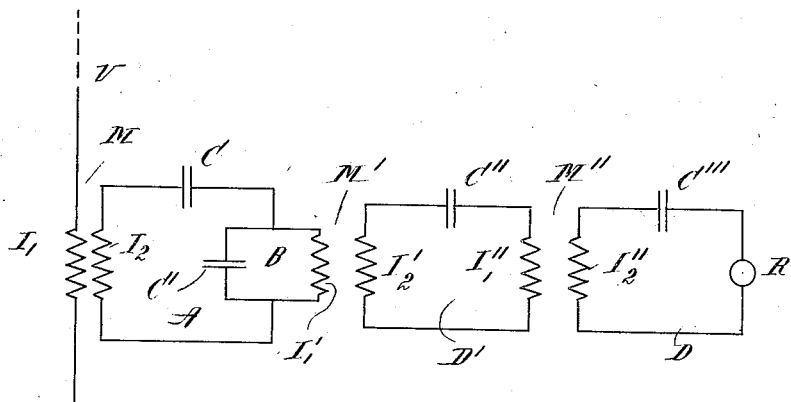

No. 884,076. PATENTED APR. 7, 1908.
E. R. CRAM.
SPACE TELEGRAPHY.
APPLICATION FILED MAY 7, 1906.

WITNESSES:
Geo. K. Woodworth
E. B. Tomlinson.

INVENTOR:
Ernest R. Cram
by Alex. P. Browne,
attorney

UNITED STATES PATENT OFFICE.

ERNEST R. CRAM, OF CAMBRIDGE, MASSACHUSETTS, ASSIGNOR TO STONE TELEGRAPH AND TELEPHONE COMPANY, OF BOSTON, MASSACHUSETTS.

SPACE TELEGRAPHY.

No. 884,076.          Specification of Letters Patent.          Patented April 7, 1908.

Application filed May 7, 1906. Serial No. 315,519.

*To all whom it may concern:*

Be it known that I, ERNEST R. CRAM, a citizen of the United States, and a resident of Cambridge, in the county of Middlesex and State of Massachusetts, have invented a new and useful Improvement in Space Telegraphy, of which the following is a specification.

My invention relates to the art of transmitting intelligence from one station to another by means of electromagnetic waves without the use of wires to guide the waves to their destination; and it relates more particularly to systems for receiving signals transmitted by such waves.

The object of my invention is to so adjust the circuits of a space telegraph receiving system that a persistent train of electromagnetic waves of the frequency to which an associated resonant receiving circuit is attuned impinging upon the elevated conductor shall cause said resonant receiving circuit to respond energetically while persistent trains of electromagnetic waves of frequencies different from that to which said resonant circuit is attuned shall produce no appreciable response in said resonant circuit, and abrupt or impulsive electrical forces acting upon the elevated conductor shall in like manner produce practically no appreciable response in said resonant circuit.

I accomplish the object of my invention by interposing between the elevated receiving conductor system and the resonant receiving circuit a circuit which is tightly coupled to said elevated conductor system and which has a pronounced natural rate of vibration different from that of said resonant receiving circuit, but which is highly responsive to persistent trains of electrical oscillations of the frequency to which said resonant receiving circuit is attuned. In other words, I accomplish the object of the present invention by giving the aforesaid interposed circuit a pronounced natural rate of vibration different from that of the waves the energy of which is to be received and, consequently, different from that to which the associated resonant receiving circuit is attuned, and by making said interposed circuit highly responsive to persistent trains of waves having the frequency of those the energy of which is to be received and, consequently, having the frequency to which the associated resonant receiving circuit is attuned.

The invention may best be understood by having reference to the drawings which accompany and form a part of this specification, and which illustrate conventionally several organizations of circuits and apparatus whereby the hereinbefore stated objects may conveniently be realized in practice.

Figure 2:
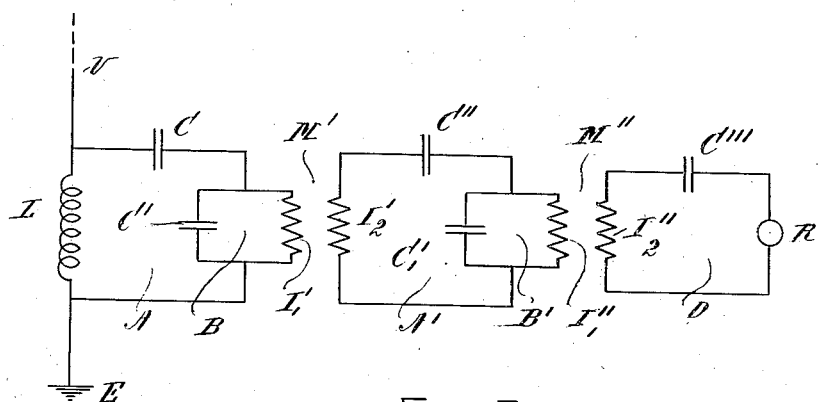
Figure 3:
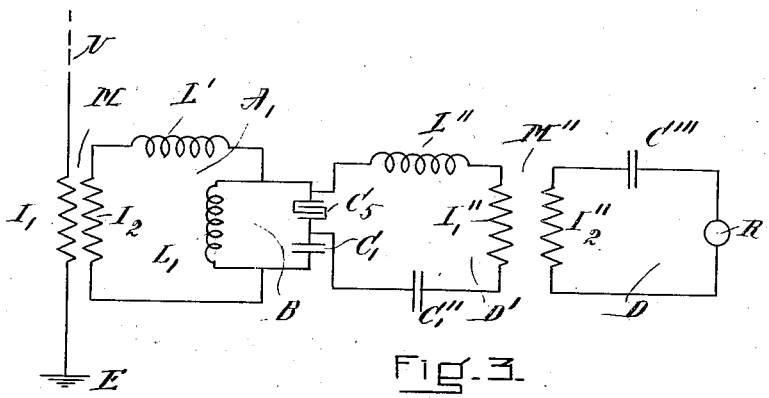

In the drawings, Figure 1 represents a space telegraph receiving system in which a circuit which is highly responsive to persistent trains of electrical oscillations of definite frequency, but which has a pronounced natural rate of vibration different from said frequency, is tightly coupled to an elevated receiving conductor system and is interposed between said system and a resonant receiving circuit which is attuned to the aforesaid definite frequency. Fig. 2 represents a modification of the system shown in Fig. 1, in which the interposed circuit is conductively tightly coupled with the elevated receiving conductor system. Fig. 3 represents a further modification of the system shown in Fig. 1 in which the coupling between the aforesaid interposed circuit and the resonant circuit is an electric coupling.

In the figures, V is an elevated receiving conductor *per se;* V $I_1$ E and V L E are elevated receiving conductor systems.

M represents a transformer.

$I_1$ and $I_2$, respectively, represent the primary and secondary windings of a transformer.

C represents a condenser.

L represents an inductance coil.

R represents an oscillation responsive device.

The various elements above enumerated are distinguished from each other as to position and function by providing the reference letters with exponents and subscripts.

A represents a circuit tightly coupled to the elevated receiving conductor system and including a parallel branch circuit B containing capacity in one branch and inductance in the other branch.

D represents a resonant receiving circuit and D' represents a resonant weeding-out circuit, each of said circuits being attuned to the frequency of the waves the energy of which is to be received.

For a more complete exposition of the general principles involved in preventing the response of a resonant receiving circuit to the electrical oscillations developed by abrupt or impulsive electrical forces acting upon an elevated receiving conductor system, with which said resonant receiving circuit is associated, by giving the elevated receiving conductor system natural rates of vibration different from the frequency to which said resonant receiving circuit is attuned, or by giving it a pronounced natural rate of vibration different from that to which the associated resonant receiving circuit is attuned, while making it highly responsive to persistent trains of waves of the frequency to which the associated resonant receiving circuit is attuned, reference may be had to Patents Nos. 767,994 and 802,425. In the systems described in said patents a parallel branch circuit containing inductance in one branch and capacity in the other branch is serially connected with the elevated conductor system and is so designed as to balance by its reactance for a persistent train of electrical oscillations of definite frequency, the reactance of the rest of the elevated conductor system. In the present invention, the circuit A contains a parallel branch circuit B and also contains a serially connected inductance and capacity, and is tightly coupled in any suitable manner with the elevated conductor system. On account of the aforesaid tight coupling the elevated conductor system and the circuit A constitute practically one oscillating system containing distributed inductance and distributed capacity as well as lumped inductance and lumped capacity. This system so constituted will have a pronounced natural rate of vibration which is different from the frequency to which the circuits D and D′ are attuned, and for persistent trains of electrical oscillations of the frequency to which the circuits D and D′ are attuned the reactance of the parallel branch circuit B balances the reactance of the circuit A as affected by its association with the elevated conductor system. Accordingly when abrupt or impulsive forces act upon the elevated conductor V, the currents developed in the circuit A are of such frequency or frequencies as to produce practically no response in the resonant receiving circuit, while when persistently applied forces of the frequency to which said resonant receiving circuit is attuned act upon the elevated conductor V, the currents developed in the circuit A are of relatively large amplitude and, being of the frequency to which the resonant receiving circuit is attuned, are translated to said resonant receiving circuit.

When the frequency of the waves the energy of which is to be received is lower than that natural to the circuit B when isolated, the amplitude of the current flowing through the inductance branch of circuit B is greater than that flowing through the condenser branch thereof, for in such case the reactance of circuit B is positive, or is the reactance of an equivalent coil. In such case, as shown in Figs. 1 and 2, the resonant weeding-out circuit D′ may be associated with the inductance branch of circuit B. When the frequency of the waves the energy of which is to be received is higher than that natural to the circuit B when isolated, the amplitude of the current flowing through the condenser branch of circuit B is greater than that flowing through the inductance branch thereof. Accordingly in such case the resonant weeding-out circuit may be associated with said condenser branch, although for convenience in controlling the coupling between circuits B and D′, the circuit D′ may be associated with the coil of circuit $A_1$ or the coil of circuit B. The coupling between circuits B and D′ and circuits D′ and D, as well as the coupling between circuits B and A′ and circuits B′ and D preferably is a loose coupling and may be accomplished in any of the ways set forth at length in Patent No. 767,984.

The circuit $A_1$ in Fig. 3 does not contain an elastic element, so that the variation with frequency of the reactance of circuit $A_1$ when isolated is linear, but in virtue of the tight coupling between said circuit and the elevated conductor system $V_1$ E, the reactance frequency variation of the system consisting of said elevated conductor system and said circuit $A_1$ will be represented by a discontinuous curve somewhat similar to curve (1) shown in Fig. 2 of Patent No. 802,425 or in Fig. 21 of Patent No. 767,994, above referred to. The circuits A of Figs. 1 and 2 each contains a condenser C and the frequency-reactance variation of each when isolated will be that characteristic of a resonant circuit, but in virtue of the tight coupling between each said circuit and its elevated conductor system, the reactance-frequency variation of the system consisting of each elevated conductor system and its associated circuit A will be represented by a discontinuous curve somewhat similar to that above referred to, of Fig. 2 of Patent No. 802,425. In all figures the reactance-frequency variation of the circuit B when isolated will be represented by a discontinuous curve similar to the curve (3) shown in Fig. 2 of Patent No. 802,425 or similar to the curve shown in Fig. 23ᴬ of Patent No. 767,994. Accordingly without going into a more detailed explanation, it will be seen that in each case the reactance of the elevated conductor system and its associated tightly-coupled circuit A or $A_1$ will be balanced by the reactance of the parallel branch circuit for a persistent train of electrical oscillations of definite frequency, while for abrupt or impulsive forces the pronounced natural rate of vibration of each elevated conductor system and its associated tightly-coupled circuit A or A, including the parallel branch circuit B will be different from that of the resonant receiving circuit.

In the system shown in Fig. 2 the circuit A' containing the parallel branch circuit B' is interposed between the resonant receiving circuit D and the system A B. For a persistent train of electrical oscillations of the frequency to which the resonant receiving circuit D is attuned, the reactance of circuit B' is equal and opposite to the reactance of the circuit A' so that the system A' B' will be highly responsive to persistent trains of electrical oscillations of said frequency, while for abrupt or impulsive electrical forces acting upon the circuit A', the natural rate of vibration of the system A' B' will be different from that to which the circuit D is attuned.

It will be obvious that many modifications may be made in the circuit arrangements hereinbefore specifically described for the purpose of more fully disclosing my invention and that therefore I do not wish to be limited to any of the specific arrangements of circuits and apparatus set forth herein.

I claim,

1. In a space telegraph receiving system, an elevated receiving conductor system; a resonant receiving circuit attuned to the frequency of the waves the energy of which is to be received; and a circuit tightly coupled to said elevated conductor system and interposed between said elevated conductor system and said resonant receiving circuit, said circuit having a pronounced natural rate of vibration different from that of said resonant receiving circuit.

2. In a space telegraph receiving system, an elevated receiving conductor system; a resonant receiving circuit attuned to the frequency of the waves the energy of which is to be received; and a circuit tightly coupled to said elevated conductor system and interposed between said elevated conductor system and said resonant receiving circuit, said circuit being provided with means whereby it is given a pronounced natural rate of vibration different from that of the resonant receiving circuit and whereby, for a persistent train of electrical oscillations of the frequency to which said resonant receiving circuit is attuned, the reactance of such interposed circuit is rendered zero.

3. In a space telegraph receiving system, an elevated receiving conductor system; a resonant receiving circuit attuned to the frequency of the waves the energy of which is to be received; and a series of circuits, interposed between said elevated receiving conductor system and said resonant receiving circuit and each having a pronounced natural rate of vibration different from that of said resonant receiving circuit, the first circuit of said series being tightly coupled to said elevated conductor system.

4. In a space telegraph receiving system, an elevated receiving conductor system; a resonant receiving circuit attuned to the frequency of the waves the energy of which is to be received; and a series of circuits, interposed between said elevated receiving conductor system and said resonant receiving circuit and each provided with means whereby it is given a pronounced natural rate of vibration different from that of the resonant receiving circuit and whereby, for a persistent train of electrical oscillations of the frequency to which said resonant receiving circuit is attuned, the reactance of each of such interposed circuits is rendered zero, the first circuit of said series being tightly coupled to said elevated conductor system.

5. In a space telegraph receiving system, an elevated receiving conductor system; a resonant receiving circuit attuned to the frequency of the waves the energy of which is to be received; a circuit tightly coupled to the said elevated conductor system and interposed between said elevated conductor system and said resonant receiving circuit; and means giving such interposed circuit a pronounced natural rate of vibration different from that of said resonant receiving circuit and making it highly responsive to persistent trains of electrical oscillations of the frequency to which said resonant receiving circuit is attuned.

In testimony whereof, I have hereunto subscribed my name this 2nd day of May 1906.

ERNEST R. CRAM.

Witnesses:
GEO. K. WOODWORTH,
E. B. TOMLINSON.